United States Patent
Kim et al.

(10) Patent No.: US 9,145,891 B2
(45) Date of Patent: Sep. 29, 2015

(54) SCROLL COMPRESSOR

(75) Inventors: Pilhwan Kim, Changwan (KR); Minwoo Roh, Changwon (KR); Haejin Oh, Changwon (KR); Sungwoo Choi, Changwon (KR)

(73) Assignee: LG ELECTRONICS INC., Seoul (KR)

(*) Notice: Subject to any disclaimer, the term of this patent is extended or adjusted under 35 U.S.C. 154(b) by 1036 days.

(21) Appl. No.: 13/005,722

(22) Filed: Jan. 13, 2011

(65) Prior Publication Data

US 2012/0009076 A1 Jan. 12, 2012

(30) Foreign Application Priority Data

Jul. 12, 2010 (KR) .................. 10-2010-0067100

(51) Int. Cl.
*F01C 1/02* (2006.01)
*F04C 18/02* (2006.01)
*F04C 28/26* (2006.01)
*F16K 17/04* (2006.01)
*F04C 23/00* (2006.01)
*F04C 28/16* (2006.01)
*F04C 29/12* (2006.01)

(52) U.S. Cl.
CPC ......... *F04C 18/0215* (2013.01); *F04C 18/0261* (2013.01); *F04C 23/008* (2013.01); *F04C 28/16* (2013.01); *F04C 28/26* (2013.01); *F04C 29/124* (2013.01); *F16K 17/04* (2013.01)

(58) Field of Classification Search
CPC ............................ F16K 17/04; F04C 18/0215
USPC .......... 418/55.1, 55.2, 75, 183, 186, 55.5, 57; 417/310, 308
See application file for complete search history.

(56) References Cited

U.S. PATENT DOCUMENTS

| | | | |
|---|---|---|---|
| 6,863,510 B2* | 3/2005 | Cho ............................. 417/440 |
| 6,893,229 B2* | 5/2005 | Choi et al. .................... 417/310 |
| 7,094,038 B2* | 8/2006 | Choi ............................ 417/310 |
| 7,189,067 B2* | 3/2007 | Yoo et al. ..................... 418/55.5 |
| 2002/0119063 A1* | 8/2002 | Morozumi ................... 418/55.5 |
| 2003/0202886 A1 | 10/2003 | Choi |

(Continued)

FOREIGN PATENT DOCUMENTS

| | | |
|---|---|---|
| CN | 1746503 | 3/2006 |
| CN | 1896518 | 1/2007 |

(Continued)

OTHER PUBLICATIONS

Chinese Office Action dated Oct. 8, 2013. (translation).

(Continued)

*Primary Examiner* — Kenneth Bomberg
*Assistant Examiner* — Anthony Ayala Delgado
(74) *Attorney, Agent, or Firm* — Ked & Associates LLP

(57) ABSTRACT

A scroll compressor is provided. The scroll compressor may include a valve and a valve spring accommodated in a housing as one module, and the housing may be directly coupled to a fixed scroll. This may simplify assembly processes of the scroll compressor. Further, a sealing recess that communicates with a middle pressure chamber may be formed at the housing, thereby forming a damping space between a high pressure space and a low pressure space. This may prevent lowering of performance of the scroll compressor due to leakage of refrigerant inside the high pressure space to the low pressure space in a normal driving mode.

22 Claims, 10 Drawing Sheets

(56) References Cited

U.S. PATENT DOCUMENTS

2009/0074593 A1* 3/2009 Joo et al. .................. 417/310
2009/0169405 A1 7/2009 Suefuji et al.

FOREIGN PATENT DOCUMENTS

| CN | 101205906 | 6/2008 |
| CN | 101372963 | 2/2009 |
| KR | 10-2006-0014847 | 2/2006 |
| WO | WO 00/73659 | 12/2000 |
| WO | WO 2007/114531 | 10/2007 |

OTHER PUBLICATIONS

European Search Report dated Sep. 24, 2014.

* cited by examiner

SCROLL COMPRESSOR

CROSS-REFERENCE TO RELATED APPLICATION(S)

Pursuant to 35 U.S.C. §119(a), this application claims priority to Korean Application No. 10-2010-0067100, filed in Korea on Jul. 12, 2010, the content of which is incorporated by reference herein in its entirety.

BACKGROUND

1. Field

A scroll compressor is disclosed herein.

2. Background

Scroll compressors are known. However, they suffer from various disadvantages.

BRIEF DESCRIPTION OF THE DRAWINGS

Embodiments will be described in detail with reference to the following drawings in which like reference numerals refer to like elements, and wherein.

DETAILED DESCRIPTION

Figure 1:
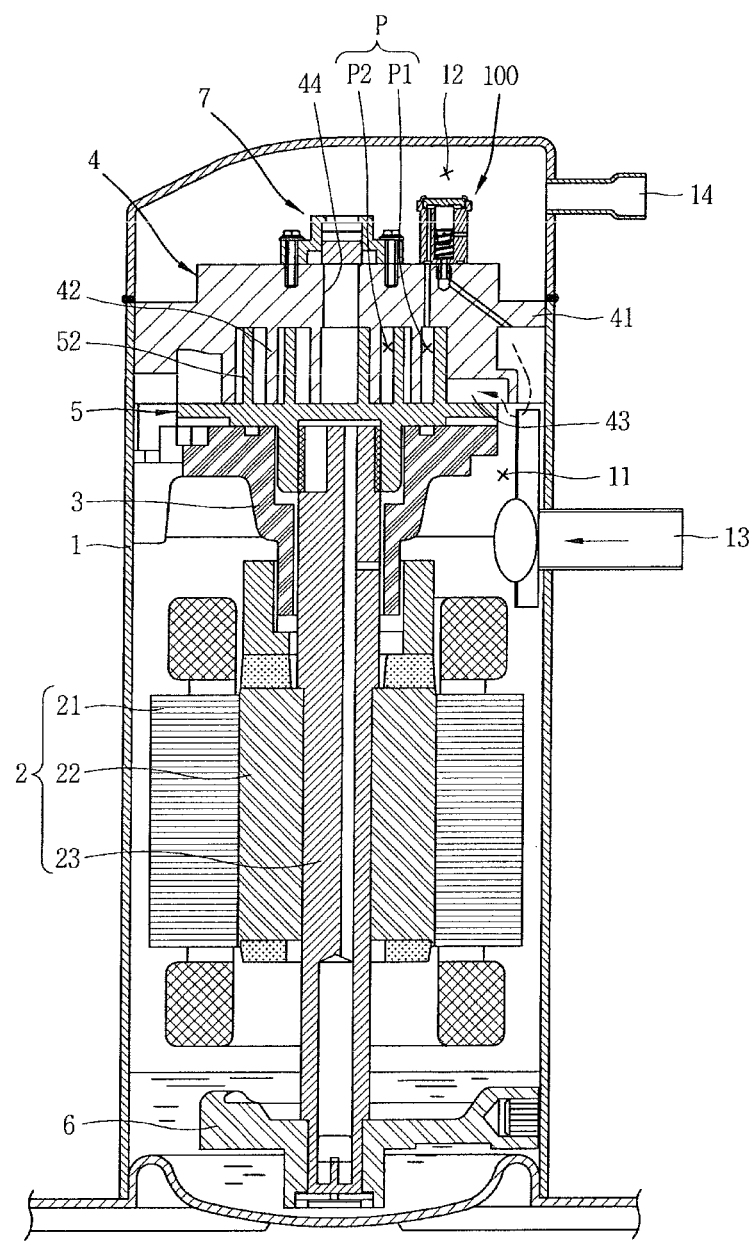
FIG. 1 is a longitudinal section view of a low pressure type scroll compressor according to an embodiment.

Description of embodiments will now be given in detail with reference to the accompanying drawings. Where possible, like reference numerals have been used to indicate like elements, and repetitive description has been omitted.

A scroll compressor is a compression apparatus that forms a pair of compression chambers, which consecutively move between a fixed wrap and an orbiting wrap when an orbiting scroll performs an orbiting motion, in a state in which a fixed scroll is fixed to an inner space of a hermetic container, and the orbiting wrap of the orbiting scroll is interlocked with the fixed wrap of the fixed scroll.

This scroll compressor may have a higher compression ratio than other types of compressors. Further, the scroll compressor may obtain a stable torque because a suction process, a compression process, and a discharge process for refrigerant may be smoothly performed. Due to these advantages, scroll compressors are widely applied to air conditioning systems as a refrigerant compression apparatus.

In the scroll compressor, a volume of the compression chamber may be gradually decreased when the orbiting scroll performs an orbiting motion, thereby compressing refrigerant filled in the compression chamber. Once the refrigerant is compressed to a predetermined compression ratio, the refrigerant is discharged out through a discharge opening. The scroll compressor may be categorized as a low pressure type or indirect suction type, and a high pressure or direct suction type according to a refrigerant suction method.

In the case of the low pressure scroll compressor, a suction space, which is a low pressure space, and a discharge space, which is a high pressure space, have to be separated from each other at a time of normal driving. On the other hand, when the low pressure scroll compressor has a very low suction pressure, such as during a pump down driving mode or a cycle blocking driving mode, the suction space and the discharge space communicate with each other. In this state, a high pressure refrigerant discharged to the discharge space backflows into the suction space. Accordingly, the refrigerant which backflows into the suction space is supplied to the compression chamber, thereby preventing a high-vacuum driving of the scroll compressor.

In the case of the high pressure scroll compressor, a suction opening which is a low pressure space, and an inner space of a hermetic container, which is a high pressure space, have to be separated from each other at a time of a normal driving mode. On the other hand, at a time of a pump down driving mode or a cycle blocking driving mode, the suction opening and the inner space of the hermetic container communicate with each other. In this state, a refrigerant discharged to the inner space of the hermetic container is partially re-introduced to the suction opening. This may prevent a high-vacuum driving of the scroll compressor.

In order to selectively shield the low pressure space and the high pressure space of the scroll compressor according to a driving condition of the scroll compressor, a valve assembly may be installed at or in a flow path between the low pressure space and the high pressure space. The valve assembly may be configured to automatically open and close the flow path between the low pressure space and the high pressure space by being automatically operated according to a pressure difference between the low pressure space and the high pressure space.

However, conventional scroll compressors may have the following problems.

First, the valve assembly for preventing high-vacuumization of the low pressure space may include a plurality of components, and the components may have to be individually assembled to one another during an assembly process(es). This may cause the scroll compressor to have a complicated fabrication process(es).

Second, because the valve assembly is disposed between the low pressure space and the high pressure space, a large pressure difference may occur therebetween. This may cause refrigerant of the high pressure space to be leaked to the low pressure space even while the scroll compressor performs a normal driving mode, resulting in lowering of a performance of the scroll compressor.

Hereinafter, a scroll compressor according to embodiments will be explained in more detail with reference to the attached drawings.

FIG. 1 is a longitudinal section view of a low pressure type scroll compressor according to an embodiment. As shown, the low pressure type scroll compressor according to the embodiment of FIG. 1 (hereinafter, referred to as a 'scroll compressor') may include a hermetic container 1 having an inner space divided into a suction space 11, which is a low pressure space, and a discharge space 12, which is a high pressure space, a drive motor 2 installed at or in the suction space 11 of the hermetic container 1 that generates a rotational force, a main frame 3 fixedly-installed between the suction space 11 and the discharge space 12 of the hermetic container 1, a fixed scroll 4 fixedly-installed on an upper surface of the main frame 3, and an orbiting scroll 5 installed between the main frame 3 and the fixed scroll 4. The orbiting scroll 5 may be eccentrically coupled to a crank shaft 23 of the drive motor 2, and may form a pair of compression chambers (P) which consecutively move together with the fixed scroll 4.

The inner space of the hermetic container 1 may be divided into the suction space 11 and the discharge space 12 by the fixed scroll 4. A suction pipe 13 may he coupled to the suction space 11 so as to communicate therewith, and a discharge pipe 14 may be coupled to the discharge space 12 so as to communicate therewith.

Although not shown, the inner space of the hermetic container may be divided into a suction and low pressure space, and a discharge and high pressure space by a discharge plenum having a hermetic discharge space and fixedly coupled to the fixed scroll. Alternatively, the inner space of the hermetic container may be divided into a suction space and a discharge space by a high and low pressure separation plate (not shown) fixed to an upper surface of the fixed scroll and closely contacting an inner circumferential surface of the hermetic container.

The fixed scroll 4 may be provided with a fixed wrap 42 that protrudes from a bottom surface of a plate portion 41, and having an involute shape so as to form a compression chamber (P) together with an orbiting wrap 52 of the orbiting scroll 5. A suction opening 43 may be formed on a bottom surface of an outer circumferential surface of the plate portion 41 of the fixed scroll, so that the suction space 11 of the hermetic container 1 may communicate with the compression chamber (P). A discharge opening 44 may be formed at a center of the plate portion 41 of the fixed scroll 4 so that the discharge space 12 of the hermetic container 1 may communicate with the compression chamber (P). The orbiting scroll 5 may be provided with the orbiting wrap 52 that protrudes from an upper surface of a plate portion 51, and having an involute shape so as to form a compression chamber (P) together with the fixed wrap 42.

Reference numeral 6 denotes a sub-frame, 7 denotes a check valve, 21 denotes a stator, and 22 denotes a rotor.

The scroll compressor according to the embodiment of FIG. 1 may he operated as follows. Once the drive motor 2 generates a rotational force by receiving power supplied thereto, the orbiting scroll 5, which is eccentrically coupled to the crank shaft 23 of the drive motor 2, forms a pair of compression chambers (P), which consecutively move between the orbiting scroll 5 and the fixed scroll 4 while the orbiting scroll 5 performs an orbiting motion. The compression chambers (P) may have a volume that gradually decreases toward the discharge opening 44 (discharge chamber) from the suction opening 43 (suction chamber) and may be consecutively formed through a plurality of stages. Hereinafter, an outer compression chamber is referred to as a first middle compression chamber (P1), and an inner compression chamber is referred to as a second middle compression chamber (P2).

Refrigerant supplied from outside of the hermetic container 1 may be introduced into the suction space 11, a low pressure space of the hermetic container 1, through the suction pipe 13. The low pressure refrigerant of the suction space 11 may be introduced to the first middle compression chamber (P1) through the suction opening 43 of the fixed scroll 4, and may be moved to the second middle compression chamber (P2) in a compressed state by the orbiting scroll 5. Then, the refrigerant may be discharged to the discharge space 12 of the hermetic container 1 through the discharge opening 44 of the fixed scroll 4. These processes may be repeatedly performed.

However, the scroll compressor may have the following problems. When an air conditioner having the scroll compressor is to be moved or when a pump down driving mode for collecting refrigerant in a condenser is to be performed, the scroll compressor may be operated in a state in which a service valve of the suction pipe is closed. The refrigerant filled in the inner space of the hermetic container 1 may be completely discharged to be moved to the condenser. In this case, the inner space of the scroll compressor may become highly-vacuumized during the pump down driving. This may cause severe problems of the scroll compressor, such as damage to the drive motor 2 and a tip seal member that seals the compression chamber.

In order to prevent these problems, as shown in FIG. 1, a vacuum prevention device 100 that prevents high-vacuumization may be installed at the inner space of the scroll compressor. When the pressure of the compression chamber (P) becomes lower than a predetermined level or when the scroll compressor is stopped, the vacuumization prevention device 100 may allow a portion of the refrigerant discharged to the discharge space 12 to backflow to the suction space 11, and thus, be re-introduced into the compression chamber (P) by providing communication between the discharge space 12 (high pressure space) and the suction space 11 (low pressure space). The vacuumization prevention device 100 may be installed inside the fixed scroll 4; however, in this case, defects may occur while the fixed scroll 4 is manufactured or processed. Alternatively, the vacuumization prevention device 100 may be installed outside of the fixed scroll 4.

Figure 2:
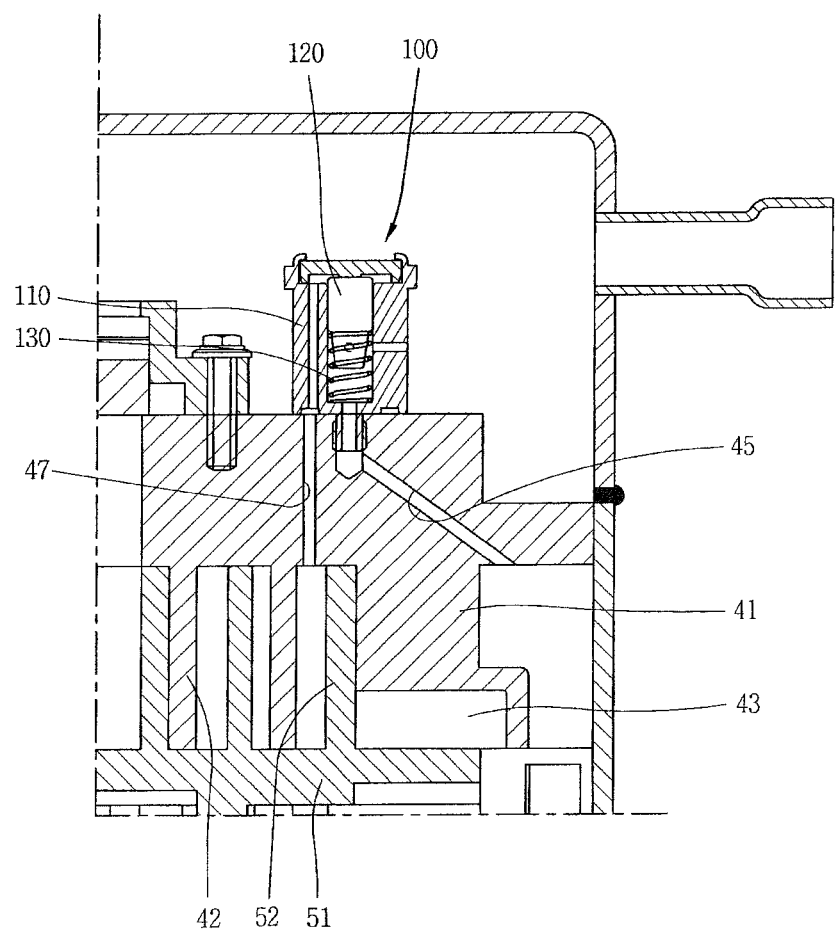
FIG. 2 is a longitudinal section view showing a state in which a vacuumization prevention device is installed at an outer side of a fixed scroll according to an embodiment.
Figure 3:
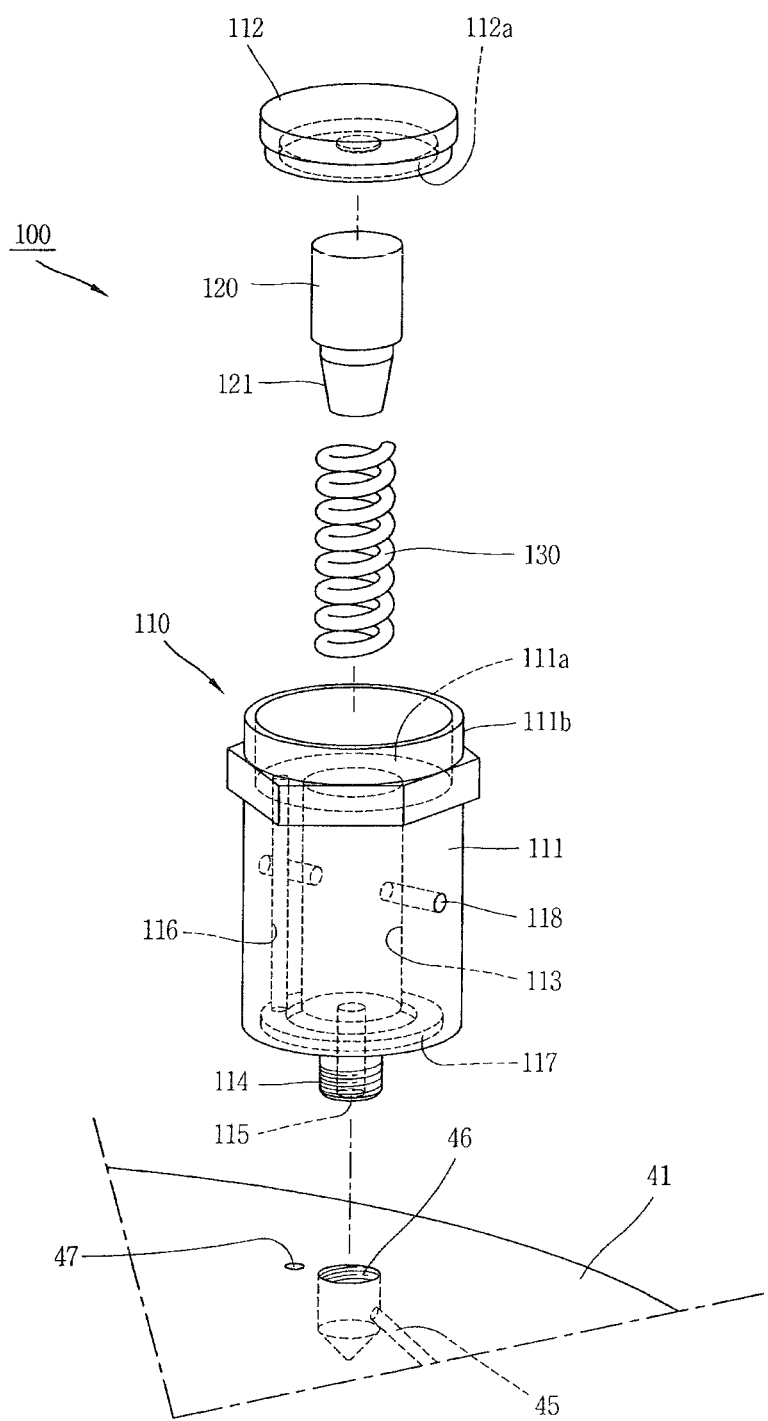
FIG. 3 is a disassembled perspective view of the vacuumization prevention device of FIG. 2.
Figure 4:
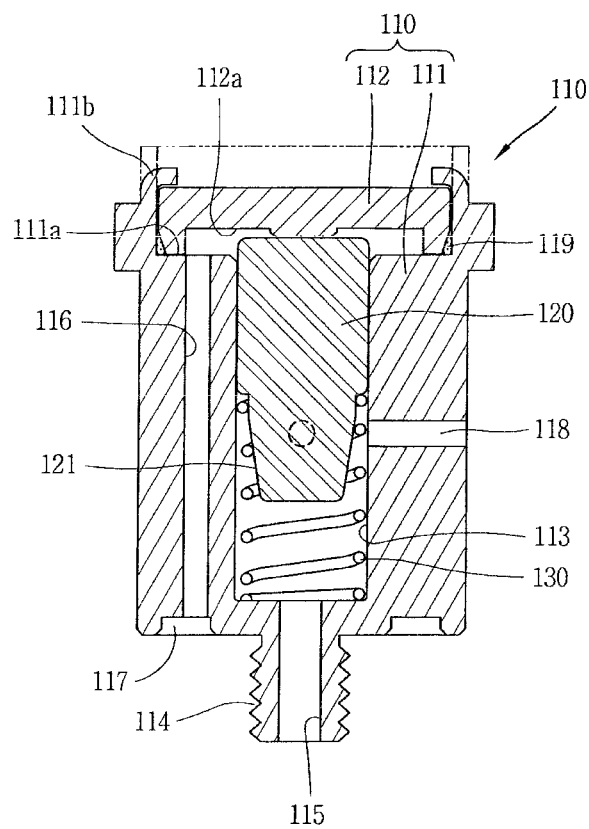
FIG. 4 is a longitudinal section view showing an assembled state of the vacuumization prevention device of FIG. 3.
Figure 5:
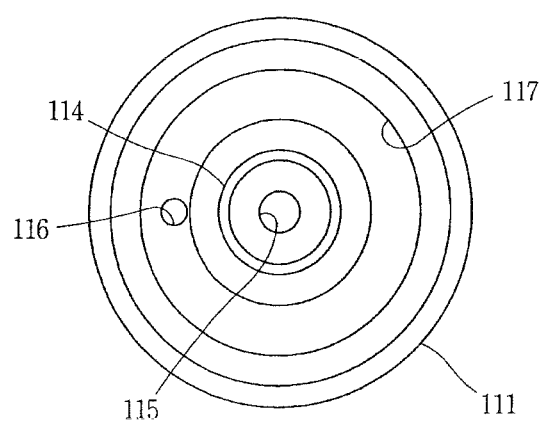
FIG. 5 is a bottom planar view of the vacuumization prevention device of FIG. 2.

FIG. 2 is a longitudinal section view showing a state in which a vacuumization prevention device is installed at an outer side of a fixed scroll according to an embodiment. FIG. 3 is a disassembled perspective view of the vacuumization prevention device of FIG. 2. FIG. 4 is a longitudinal section view showing an assembled state of the vacuumization prevention device of FIG. 3. FIG. 5 is a bottom planar view of the vacuumization prevention device of FIG. 2.

Referring to FIGS. 2 to 5, the vacuumization prevention device 100 may include a housing 110 coupled to an upper surface of the fixed scroll 4, a sliding valve 120 slidably inserted in the housing 110 in an axial direction and configured to selectively open and close a flow path between the discharge space 12 and the suction space 11 of the hermetic container 1, and a valve spring 130 configured to support the sliding valve 120 in an axial direction. When the respective components of the vacuumization prevention device 100, that is, the housing 110, the sliding valve 120, and the valve spring 130 are assembled with other components, the scroll compressor may have a complicated assembly process(es). Accordingly, the vacuumization prevention device 100 may be fabricated as a complete module in an additional process, and then simply assembled at a compressor assembly spot. This may lower the fabrication costs of the scroll compressor.

The housing 110 may include of a housing body 111, and a housing cover 112 coupled to the housing body 111. A valve hole 113 may be formed at or in the housing body 111, and the valve hole 113 may be covered by a housing cover 112. The valve hole 113 may have a predetermined length and may be formed at a center of the housing body 111. Further, the valve hole 113 may be cylindrical in shape and may have a partially-blocked lower end and a completely open upper end.

A fixing portion 114 configured to fix the housing body 111 to the fixed scroll 4 may protrude from a center of a bottom surface of the housing body 111. A suction pressure hole 115 configured to provide communication between the valve hole 113 and a first bypass passage 45 which will be later explained, may be penetratingly formed at or in the fixing portion 114 in a lengthwise direction.

The first bypass passage 45 may be formed at or in the plate portion 41 of the fixed scroll 4 so as to provide communication between the discharge space 12 of the hermetic container 1 and the suction space 11. A valve mounting recess 46 having a sectional area larger than that of the first bypass passage 45 may be formed at an end of the first bypass passage 45. A female screw thread configured to couple with a male screw thread provided at or in the fixing portion 114 of the housing body 111 may be formed on an inner circumferential surface of the valve mounting recess 46. However, the fixing portion 114 may be inserted into the valve mounting recess 46 by, for example, pressing or welding. In this case, a sealing member (not shown), such as an O-ring, may be installed between the fixing portion 114 and the valve mounting recess 46.

Figure 6:
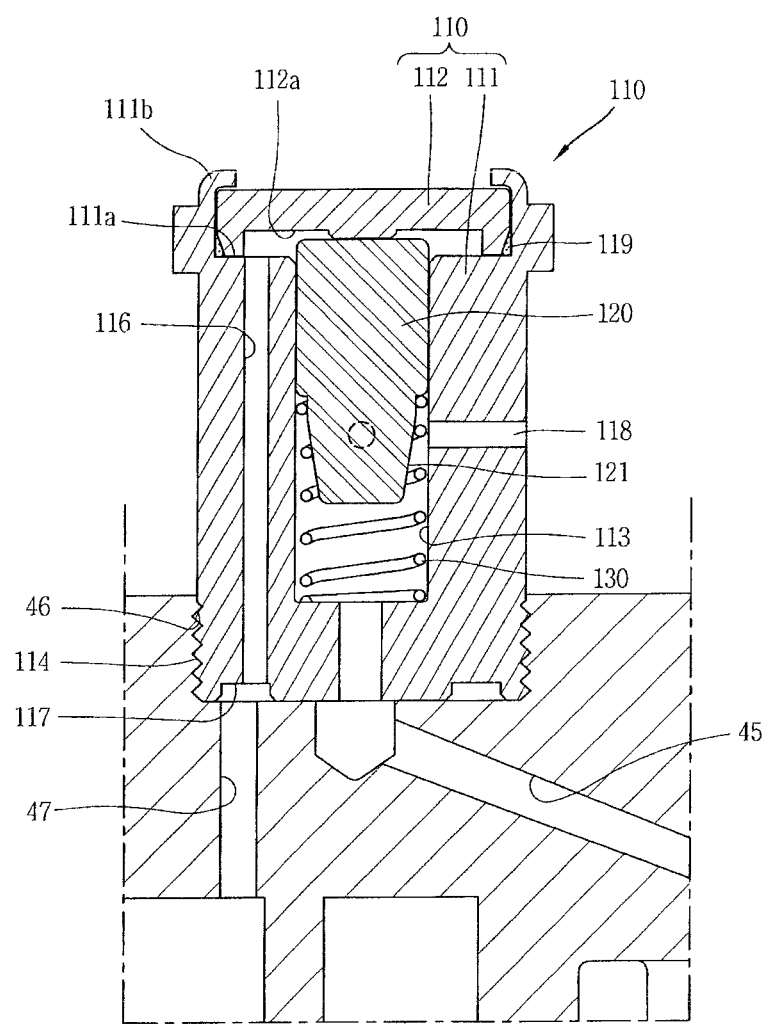
FIG. 6 is a longitudinal section view of a fixing portion of the vacuumization prevention device of FIG. 4.

The housing body 111 may not include the fixing portion 114 shown in FIG. 6, but rather, may be provided with a male screw thread on an outer circumferential surface thereof. In this case, the male screw thread may be coupled to a female screw thread provided on an inner circumferential surface of the valve mounting recess 46. A second bypass passage 47 may be formed to be in the valve mounting recess 46. In this case, the fixing portion 114 may have an outer diameter larger than that when the fixing portion 114 is formed to have the protrusion shape. This may allow the housing to be stably fixed, and the scroll compressor to have an enhanced performance due to a large sealing area.

Although not shown, a fixing portion (not shown) may be formed on an outer circumferential surface of the housing body 111 in the form of a flange, and may be coupled to the housing body 111 by, for example, bolts.

A middle pressure hole 116 may be penetratingly formed at one side of the valve hole 113 of the housing body 111 in a lengthwise direction from a lower end to an upper end of the housing body 111. A sealing recess 117 may be formed at a lower end of the middle pressure hole 116, so that refrigerant of a middle pressure (Pb) introduced through the second bypass passage 47 provided at or in the plate portion 41 of the fixed scroll 4 may encompass the periphery of the fixing portion 114, more specifically, the suction pressure hole.

As shown in FIG. 5, the sealing recess 117 may have a ring shape so as to always communicate with the second bypass passage when the vacuumization prevention device 100 is assembled. To prevent communication between the two compression chambers, the second bypass passage 47 may have a size not larger than a gap between itself and the fixed wrap 42, that is, a size smaller than the gap. Although not shown, the sealing recess 117 may be formed in a ring shape so as to communicate with the middle pressure hole 116 on an upper surface of the fixed scroll 4, that is, a periphery of the second bypass passage 116.

A discharge pressure hole 118 may be penetratingly formed at an intermediate portion or height of the housing body 111 and extending in a radial direction from an outer circumferential surface of the housing body 111 to an inner circumferential surface of the valve hole 113. Further, a stepped surface 111a for mounting the housing cover 112 may be formed on an upper end of the housing body 111, and a cover supporting portion 111b configured to receive and support the housing cover 112 may be formed on an outer circumferential surface of the stepped surface 111a in, for example, a ring shape. The cover supporting portion 111b may have a length long enough to receive the housing cover 112 forcibly inserted therein, and then may be bent to support the housing cover 112 in a pressing manner, as shown in FIG. 6.

The housing cover 112 may be formed, for example, in a disc shape so as to be forcibly inserted into the cover supporting portion 111b of the housing body 111. A communication recess 112a configured to provide communication between the middle pressure hole 47 of the housing body 111 and the valve hole 113 may be formed on a bottom surface of the housing cover 112 in, for example, a ring shape.

Figure 7:
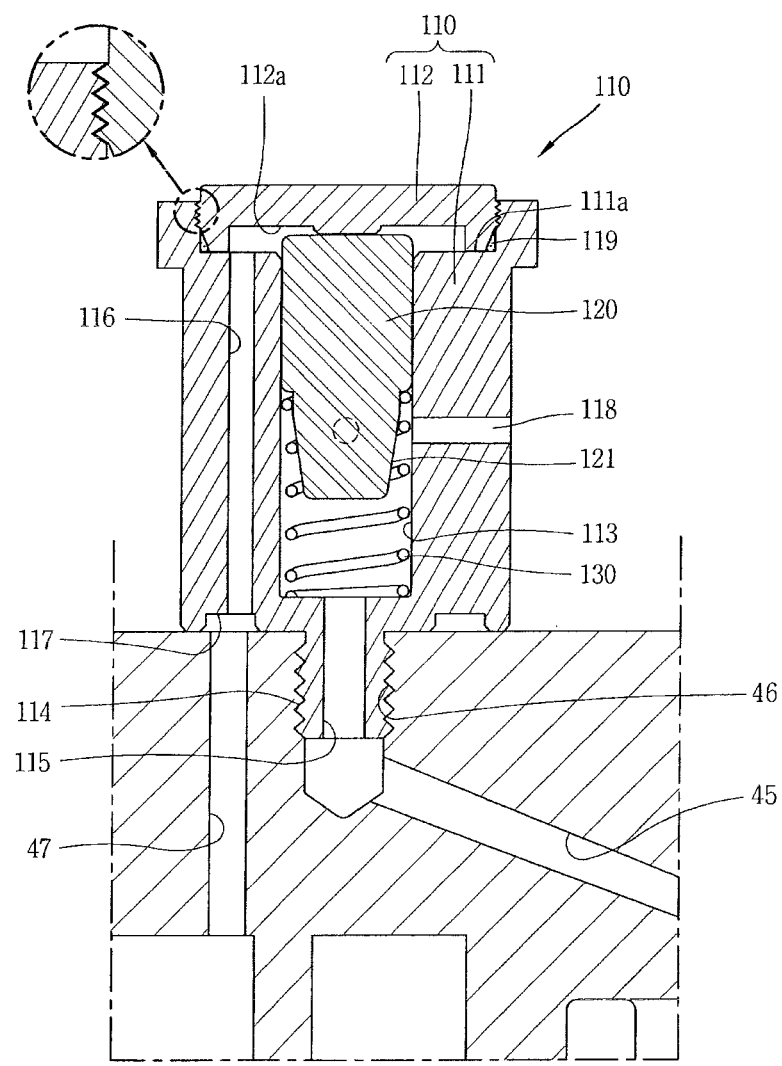
FIG. 7 is a longitudinal section view showing a coupling method of a housing cover of the vacuumization prevention device of FIG. 4.

A sealing member 119, such as an O-ring, may be inserted between the housing body 111 and the housing cover 112. Further, as shown in FIG. 7, an outer circumferential surface of the housing cover 112 may be screw-coupled to the cover supporting portion 111b of the housing body 111.

The sliding valve 120 may have a size large enough for an outer circumferential surface thereof to slidably contact an inner circumferential surface of the valve hole 113. Further, the sliding value 120 may be formed of a material having a light weight and lubrication characteristics, such as metal or engineered plastic. A fixing protrusion 121 may be formed on a bottom surface of the sliding valve 120 so as to forcibly receive an upper end of the valve spring 130.

The valve spring 130 may be a compression coil spring having both ends fixed to a lower end of the housing body 111 and the bottom surface of the sliding valve 120, respectively. The valve spring 130 may have sufficient elasticity to allow an upward motion of the sliding valve 120 (that is, an operation to open the discharge pressure hole as the sliding valve is rapidly moved up when the compression chamber becomes high-vacuumized).

Operation of the vacuumization prevention device of the scroll compressor according to embodiments will be explained hereinafter.

Figure 8:
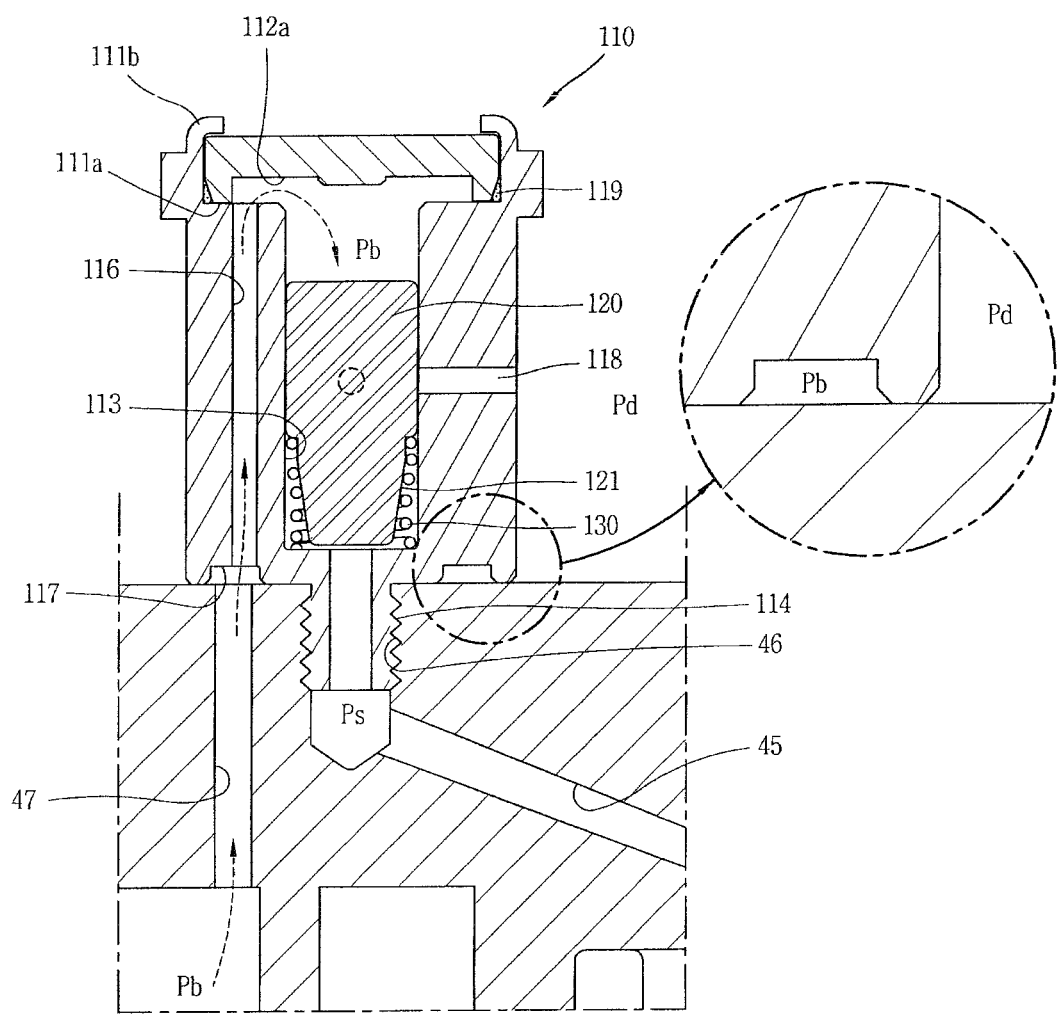
FIG. 8 is a longitudinal section view showing an operation of the vacuumization prevention device when the scroll compressor operates in a normal driving mode.
Figure 9:
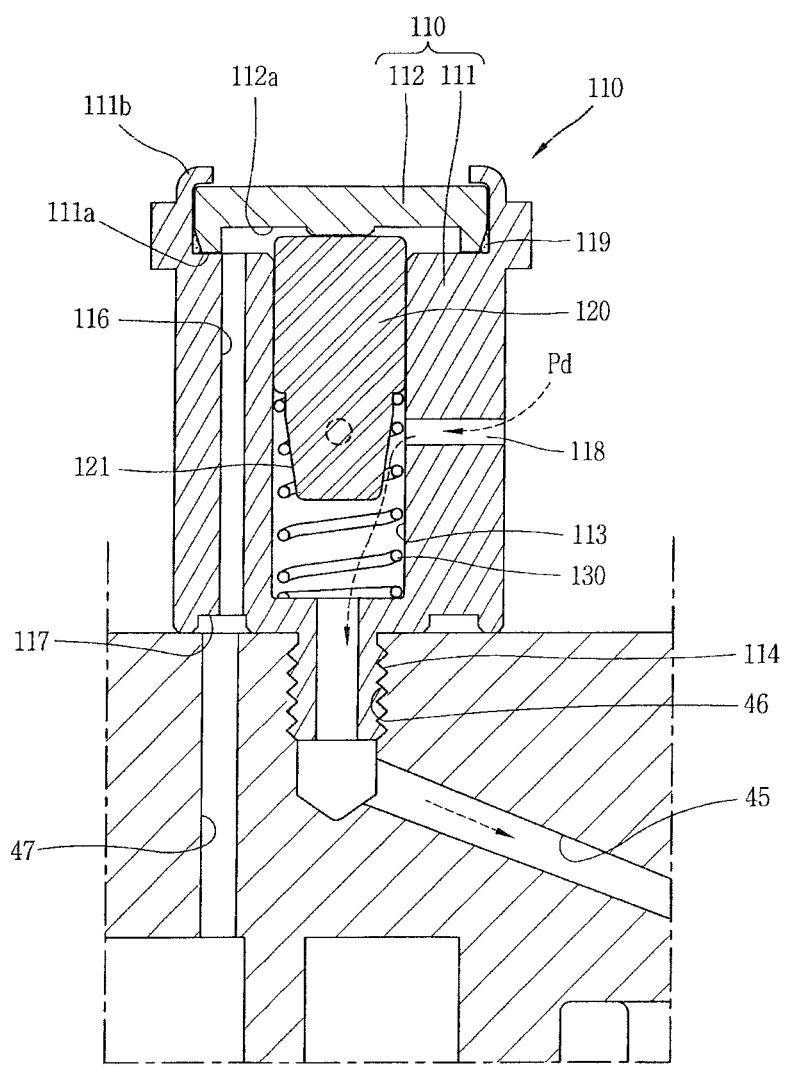
FIG. 9 is a longitudinal section view showing an operation of the vacuumization prevention device when the scroll compressor operates in a high-vacuum driving mode.

FIG. 8 is a longitudinal section view showing an operation of the vacuumization prevention device when a scroll compressor is operated in a normal driving mode. FIG. 9 is a longitudinal section view showing an operation of the vacuumization prevention device when the scroll compressor is operated in a high-vacuum driving mode.

As shown in FIG. 8, when the scroll compressor is normally operated, refrigerant inside the compression chamber (P) may be introduced into an upper end of the valve hole 113 through the second bypass passage 47, the middle pressure hole 116, and the communication recess 112a. Then, the refrigerant may apply pressure to an upper surface of the sliding valve 120. The sliding valve 120 may overcome the elasticity of the valve spring 130, and downwardly move to block the discharge pressure hole 118.

The refrigerant at a middle pressure (Pb) may be introduced into the sealing recess 117 of the housing body 111 through the second bypass passage 47, thereby passing to the suction pressure hole 115. As a result, a damping space having the middle pressure (Pb) with respect to a discharge pressure (Pd) and a suction pressure (Ps) may be formed between the discharge space 12 and the suction pressure hole 11. This may effectively prevent refrigerant discharged to the discharge space 12 from leaking to the first bypass passage 45 through the vacuumization prevention device 100 when the scroll compressor is operated in a normal driving mode. Accordingly, lowering of a performance of the scroll compressor may be prevented.

On the other hand, when the scroll compressor is operated in a high-vacuum mode, that is, performs a high-vacuum driving, as shown in FIG. 9, the compression chamber (P) may have a drastically lowered pressure. As a result, pressure applied to an upper end of the sliding valve 120 may be lowered more than in the normal driving mode. As the sliding valve 120 is upwardly moved by a restoration force of the valve spring 130, the discharge pressure hole 118 may be opened. The refrigerant having been filled in the discharge space 12 may be discharged to the valve hole 113 through the discharge pressure hole 118, and then introduced into the suction space 11 through the suction pressure hole 115 and the first bypass passage 45. As a result, the suction space 11 may be prevented from having a drastically-increased temperature, and thus, damage to the drive motor 2 prevented. The refrigerant sucked into the suction space 11 may be supplied to the compression chamber (P), and then discharged to the discharge space 12. These processes may be repeatedly performed.

As the suction pressure hole 115 may be formed at a lower end of the housing body 111, the suction pressure hole 115 and the first bypass passage 45 may have short lengths. Accordingly, when the compression chamber (P) becomes highly-vacuumized, the refrigerant inside the discharge space 12 may backflow to the suction space 11 more rapidly. This may prevent the scroll compressor from being in the high-vacuumized state.

Hereinafter, a vacuumization prevention device of a scroll compressor according to another embodiment will be explained. In the previous embodiment, the housing included the housing body and the housing cover configured to cover an open end of the housing body. However, in this embodiment, the housing may include a first housing and a second housing.

Figure 10:
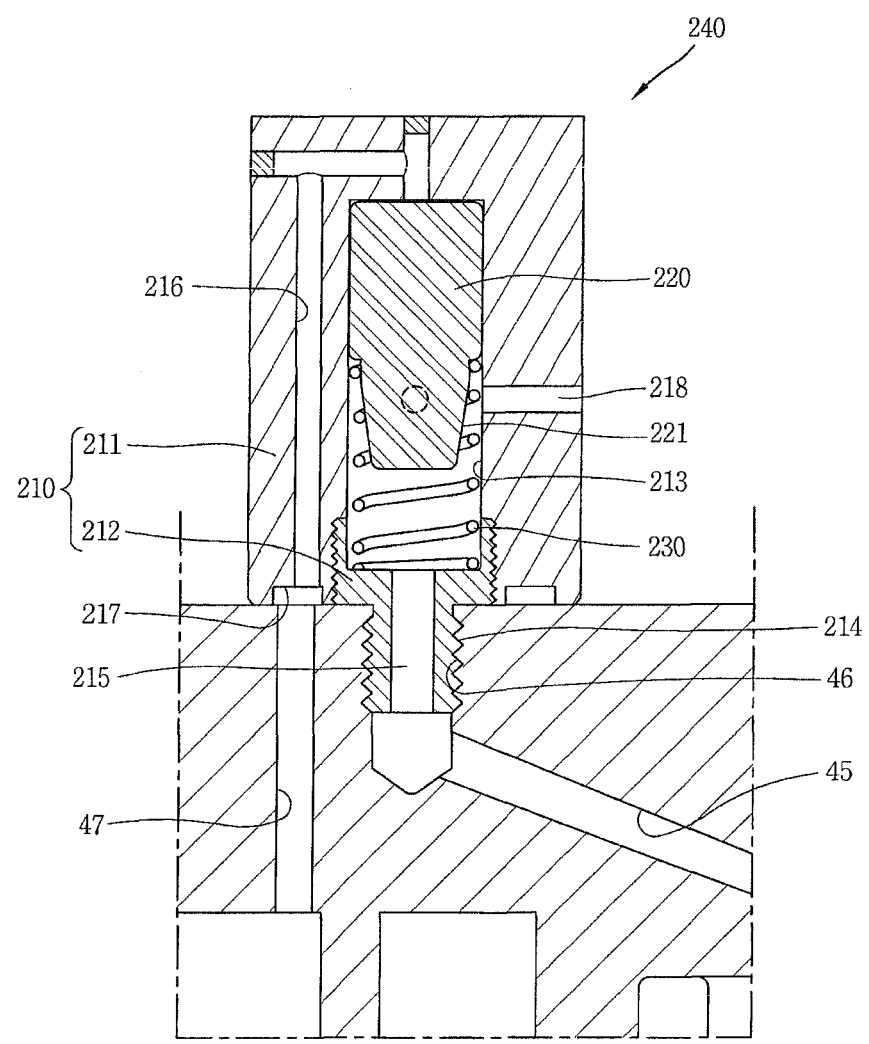
FIG. 10 is a longitudinal section view showing a vacuumization prevention device of a scroll compressor according to another embodiment.

FIG. 10 is a longitudinal section view showing a vacuumization prevention device of a scroll compressor according to another embodiment. Referring to FIG. 10, a housing 210 may include a first housing 211 and a second housing 212. The first housing 211 may include a valve hole 213 formed extending in upper and lower directions and configured to slidably receive a sliding valve 220 thereinto, a middle pressure hole 216 formed at one side of the valve hole 213 in a lengthwise direction that communicates with an upper end of the valve hole 213, and a discharge pressure hole 218 that communicates with an intermediate part of the valve hole 213. The middle pressure hole 216 may be penetratingly formed in lengthwise and radial directions, and may have an end closed by a member, such as, for example, a bolt closure. Accordingly, the middle pressure hole 216 may be implemented as a single hole.

The second housing 212 may be coupled to a lower end of the first housing 211, for example, by pressing or welding, or by using bolts, so as to cover a lower end of the valve hole 213. A sealing member (not shown), such as an O-ring, may be inserted between the first housing 211 and the second housing 212 for an enhanced sealing effect. A sealing recess 217, which may have a ring shape, may be formed at a lower end of the middle pressure hole 216 so as to communicate with the second bypass passage 47 of the fixed scroll 4.

A fixing portion 214 may be formed at the second housing 212 so as to be inserted into the valve mounting recess 46 of the fixed scroll 4. This fixing portion 214 may protrude from a center of a lower surface of the second housing 212 by a predetermined height, or may be implemented by a lower part of the second housing 212, as shown in FIG. 6. In a case that a female screw thread is formed on an inner circumferential surface of the valve mounting recess 46, the fixing portion 214 may be provided with a male screw thread screw-coupled to the female screw thread.

Like in the aforementioned embodiment, a suction pressure hole 215 may be formed at a center of the fixing portion 214. Other configurations and effects may be similar to those of the aforementioned embodiment, and thus, detailed explanations have been omitted.

In this embodiment, the housing 210 may include the first housing 211 and the second housing 212. This may effectively seal an upper end of the valve hole 213, thereby enhancing reliability of the vacuumization prevention device.

Figure 11:
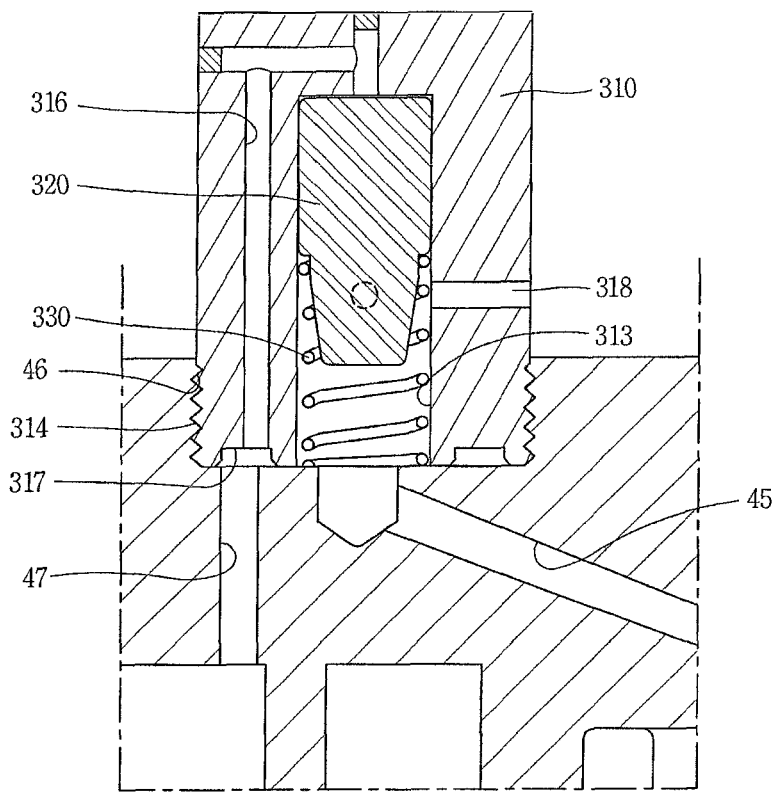
FIG. 11 is a longitudinal section view showing a vacuumization prevention device of a scroll compressor according to still another embodiment.

A vacuumization prevention device of a scroll compressor according to another embodiment will be explained hereinafter. In the previous embodiment, the housing is formed by combining a plurality of components with each other. However, in this embodiment, the housing may include one component. FIG. 11 is a longitudinal section view showing a vacuumization prevention device for a scroll compressor according to still another embodiment.

Referring to FIG. 11, a housing of the vacuumization prevention device according to this embodiment may include a housing body 310, which may be formed in a cylindrical shape having one open end and another closed end, a sliding valve 320, and a valve spring 330 provided at the housing body 310.

The housing body 310 may be provided with a valve hole 313 at a center thereof, and a lower end of the valve hole 313 may be open to implement a suction pressure hole (not shown). The housing body 310 may be insertingly-coupled to a valve mounting recess of the first bypass passage 45. A fixing portion 314 having a male screw thread so as to be coupled to a female screw thread of the valve mounting recess 46 may be formed at a lower end of the housing body 310, that is, an outer circumferential surface of the opening. The fixing portion 314 may be coupled to the valve mounting recess by, for example, pressing or welding. A middle pressure hole 316 may be formed at one side of the valve hole 313 in a lengthwise direction, and a sealing recess 317 may be formed at a lower end of the middle pressure hole 316 in, for example, a ring shape so as to communicate with the second bypass passage 47 of the fixed scroll 4.

A discharge pressure hole 318 configured to communicate a discharge space 12 and a suction space 11 with each other may be formed at an intermediate part of the valve hole 313. Other configurations and effects of a vacuumization prevention device according to this embodiment may be similar to those of the previous embodiment(s), and thus, their detailed explanations have been omitted. In this embodiment, the housing may be one component, which may reduce fabrication costs. However, as the suction pressure hole of the housing is open, it may be difficult to modularizing the vacuumization prevention device. Accordingly, a temporary closure may be provided at the opening of the vacuumization prevention device, configured to block the opening when moving the vacuumization prevention device, but open the opening when assembling the vacuumization prevention device to the scroll compressor.

In the scroll compressor according to embodiments disclosed herein, the vacuumization prevention device may include one component, thus, it may be modularized. This may simplify the assembly processes of the scroll compressor. Further, a middle pressure may be formed between inside and outside of the vacuumization prevention device. This may prevent lowering of a performance of the scroll compressor resulting from leakage of refrigerant of the discharge space to the suction space through the vacuumization prevention device.

According to embodiments, the vacuumization prevention device may be applied to a low pressure type scroll compressor in which an inner space of a hermetic container is divided into a suction space and a discharge space. However, the vacuumization prevention device may be also applied to a high pressure type scroll compressor in which the inner space of the hermetic container forms the discharge space. In this case, the first bypass passage may be formed so as to communicate with the suction opening of the fixed scroll.

A scroll compressor according to embodiments may be capable of preventing vacuumization by returning a part of a refrigerant discharged to a high pressure space to a low pressure space when the low pressure space is vacuumized during an operation.

Further, embodiments disclosed herein provide a scroll compressor capable of having simplified assembly processes by modularizing a valve assembly, and thus, may be capable of reducing fabrication costs.

Further, embodiments disclosed herein provide a scroll compressor capable of having an enhanced performance by reducing leakage of refrigerant to a low pressure space from a high pressure space in a normal driving mode, by reducing a pressure difference at a periphery of the valve assembly.

According to embodiments disclosed herein, a scroll compressor is provided that may include a hermetic container having an inner space divided into a low pressure space and a high pressure space; a compression unit or device installed at the inner space of the hermetic container, and forming a compression chamber which consecutively moves as spiral wraps provided at a plurality of scrolls perform a relative motion by being interlocked with one another; and a valve assembly installed between the low pressure space and the high pressure space of the hermetic container, and configured to selectively communicate the low pressure space and the high pressure space with each other. A sealing recess may be formed at a contact surface between the compression unit and the valve assembly, and the sealing recess may be formed so as to communicate with an intermediate part of the compression chamber.

Further, according to embodiments disclosed herein, a scroll compressor that may include a hermetic container having an inner space divided into a low pressure space and a high pressure space; a compression unit or device installed at the inner space of the hermetic container, and forming a compression chamber which consecutively moves as spiral wraps provided at a plurality of scrolls perform a relative motion by being interlocked with one another; and a valve assembly installed between the low pressure space and the high pressure space of the hermetic container, and configured to selectively communicate the low pressure space and the high pressure space with each other. The valve assembly may include a housing installed between the low pressure space and the high pressure space, having a valve hole to communicate the high pressure space and the low pressure space with each other, having a suction pressure hole to communicate the valve hole and the low pressure space, and having a discharge pressure hole to communicate the valve hole and the high pressure space; a valve slidably inserted into the valve hole of the housing, and configured to selectively open and close a flow path between the low pressure space and the high pressure space; and an elastic member disposed at the valve hole of the housing, and configured to elastically support the valve. A fixing portion configured to fix the valve assembly to the compression unit may be formed at the housing.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A scroll compressor, comprising:
   a hermetic container having an inner space divided into a low pressure space at a suction pressure and a high pressure space at a discharge pressure;
   a compression device installed at or in the inner space of the hermetic container, and forming a compression chamber that consecutively moves as a plurality of spiral wraps provided at a plurality of scrolls perform a relative motion by being interlocked with one another; and
   a valve assembly installed between the low pressure space and the high pressure space of the hermetic container, and configured to provide selective communication between the low pressure space and the high pressure space, wherein a sealing recess is formed at a contact surface between the compression device and the valve assembly, wherein the sealing recess communicates with an intermediate portion of the compression chamber to form an intermediate pressure between the suction pressure and the discharge pressure, wherein a first bypass passage configured to provide selective communication between the low pressure space and the high pressure space via the valve assembly is formed at or in the compression device, and wherein a portion of the first bypass passage is spaced apart from and surrounded by the sealing recess.

2. The scroll compressor of claim 1, wherein the sealing recess is formed in a ring shape so as to surround the outlet of the first bypass passage.

3. The scroll compressor of claim 2, wherein a second bypass passage configured to open and close the valve assembly according to a pressure of the compression chamber is formed at or in the compression device, wherein the sealing recess communicates with the second bypass passage.

4. conditioner comprising the scroll compressor of claim 1.

5. The scroll compressor of claim 1, wherein the valve assembly comprises:
   a housing installed between the low pressure space and the high pressure space, the housing having a valve hole that provides communication between the high pressure space and the low pressure space, a suction pressure hole that provides communication between the valve hole and the low pressure space, and a discharge pressure hole that provides communication between the valve hole and the high pressure space;

a valve slidably disposed within the valve hole, and configured to selectively open and close a flow path between the low pressure space and the high pressure space; and an elastic member disposed at or in the valve hole, and configured to elastically support the valve, wherein a fixing portion configured to fix the valve assembly to the compression device is formed at or in the housing.

6. The scroll compressor of claim 5, wherein the fixing portion is coupled to the outlet of the first bypass passage, and wherein a suction pressure hole is formed at or in the fixing portion so as to communicate with the first bypass passage.

7. The scroll compressor of claim 6, wherein a second bypass passage configured to provide communication between an intermediate portion of the compression chamber and the high pressure space is formed at or in the compression device, wherein a middle pressure hole configured to provide communication between the second bypass passage and the valve hole is formed at or in the housing, wherein an end of the middle pressure hole is disposed at an opposite side to an end of the suction pressure hole with the valve interposed therebetween, and wherein the discharge pressure hole is formed between the middle pressure hole and the suction pressure hole.

8. The scroll compressor of claim 7, wherein the sealing recess is formed between the second bypass passage and the middle pressure hole.

9. The scroll compressor of claim 7, wherein a diameter of the second bypass passage is equal to or smaller than a gap between the plurality of wraps.

10. The scroll compressor of claim 7, wherein the housing comprises:

a housing body having the valve hole, the middle pressure hole, the suction pressure hole, and the discharge pressure hole; and a housing cover configured to cover the valve hole.

11. The scroll compressor of claim 10, wherein the housing body and the housing cover are coupled to each other by at least one of pressing, welding, or a bolt.

12. The scroll compressor of claim 10, wherein the housing body is provided with a cover supporting portion configured to support the housing cover, an end thereof being bent.

13. The scroll compressor of claim 10, wherein a sealing member is interposed between the housing body and the housing cover.

14. The scroll compressor of claim 10, wherein a sealing member is interposed between the housing body and the fixed scroll.

15. The scroll compressor of claim 10, wherein the middle pressure hole is penetratingly formed at or in the housing body in a lengthwise direction, and wherein a communication recess configured to provide communication between the middle pressure hole and the valve hole is formed at or in the housing cover.

16. The scroll compressor of claim 7, wherein the housing comprises:

a first housing having the valve hole, the middle pressure hole, and the discharge pressure hole; and a second housing configured to cover the valve hole of the first housing, and having the suction pressure hole disposed therein.

17. The scroll compressor of claim 16, wherein the first housing and the second housing are coupled to each other by at least one of pressing, welding, or a bolt.

18. The scroll compressor of claim 16, wherein a sealing member is interposed between the first housing and the second housing.

19. The scroll compressor of claim 7, wherein the housing comprises a housing body having the valve hole, the middle pressure hole, and the discharge pressure hole, and wherein one end of the valve hole which cons lutes an opening of the housing body is open to be connected to the first bypass passage, and is fixed to the compression device.

20. The scroll compressor of claim 5, wherein the valve assembly is provided with a fixing portion formed on one side surface of the housing in a shape of a protrusion having a predetermined height and diameter.

21. The scroll compressor of claim 5, wherein an outer circumferential surface of the housing of the valve assembly is insertingly fixed to the compression device.

22. An air conditioner comprising the scroll compressor of claim 5.

* * * * *